United States Patent
Ando et al.

(10) Patent No.: US 6,836,044 B2
(45) Date of Patent: Dec. 28, 2004

(54) PERMANENT MAGNET TYPE ROTARY ELECTRIC DEVICE

(75) Inventors: Susumu Ando, Shuuchi-gun (JP); Hideaki Takahashi, Shuuchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 59 days.

(21) Appl. No.: 10/065,474

(22) Filed: Oct. 22, 2002

(65) Prior Publication Data

US 2003/0080641 A1 May 1, 2003

(30) Foreign Application Priority Data

Oct. 29, 2001 (JP) ........................................ 2001-330552

(51) Int. Cl.[7] ............................................. H02K 21/12
(52) U.S. Cl. ................................. 310/156.38; 310/51
(58) Field of Search ............................. 310/156.38, 51, 310/254, 156.43, 156.44, 184

(56) References Cited

U.S. PATENT DOCUMENTS 4,812,692 A * 3/1989 Arita .......................... 310/49 R
6,285,104 B1 * 9/2001 Nashiki ....................... 310/184

OTHER PUBLICATIONS

Patent Abstracts of Japan vol. 010 No. 13.
Patent Abstracts of Japan vol. 015 No. 284.
Zhu Z Q et al Influence of Cogging Torque in Permanent Magnet Machines.
European Search Report Dated Feb. 24, 2003.

* cited by examiner

Primary Examiner—Thanh Lam
(74) Attorney, Agent, or Firm—Ernest A Beutler

(57) ABSTRACT

Two embodiments of rotating electrical machines wherein the cogging torque is substantially reduced by increasing the cogging number without increasing the number of pole teeth and permanent magnets. This is done by selecting the appropriate magnet angle to increase the number of coggings per revolution and this can be done using a computer analysis of the cogging torque for the individual magnets rather than by a trial and error method.

17 Claims, 4 Drawing Sheets

PERMANENT MAGNET TYPE ROTARY ELECTRIC DEVICE

BACKGROUND OF INVENTION

This invention relates to a permanent magnet rotary type electrical device or machine such as an electric motor or generator and to an improved method for making such machines.

As is known, rotary electric machines such as a brushless DC motor or generator utilize a permanent magnet element having a plurality of permanent magnets fixed thereon. The permanent magnet element is juxtaposed to an element having a plurality of poles around which coils are wound and the elements are supported for relative rotation. In a motor, the magnetic field formed by the coil windings is controlled so as to effect rotation. In a generator, relative rotation induces voltage in coil windings.

In such machines, the permanent magnets are disposed at circumferentially equal intervals. The slots between the core teeth are also disposed circumferentially at equal intervals. When the machine is used as a generator, it is desirable that the torque necessary to effect rotatation when output of the generator is zero (referred to as a cogging torque) is as small as possible. Increased cogging torque will necessitates a larger driving force of an engine or the like to rotate the generator, thus resulting in a larger vibration and load. If it is used as a motor, drive torque in idling becomes larger resulting in power loss as well as increased.

It is generally accepted that the cogging torque is inversely proportional to the square of what is referred to as a cogging number. This cogging number is basically the number of coggings that occur each revolution of the machine. This being the number of times the magnetic cores pole passes a permanent magnet per revolution.

Therefore, one prior art method used to decrease the cogging torque or the variation in rotation is to increase the number of poles. For example, a motor or a generator in which the number of slots S between the poles on which the coils are wound is nine and the number of magnetic poles P is eight, that is, a system of 9-slot and 8-pole construction, is known. In this case, the cogging frequency or cogging number has a sufficiently high value of 72/revolution. Therefore, the cogging torque becomes sufficiently small.

With this method, however, it is necessary to increase the number of poles P and the number of slots S, and the construction becomes more complex with increasing P or S, causing an increase in the number of parts as well as making the assembly more expensive to produce.

Another prior art method for reducing the cogging torque employs permanent magnets or slots that are disposed oblique to the rotational axis (that is, a so-called "skew" is imparted). This method is employed to smoothen the circumferential distribution change in the magnetic field so as to decrease the cogging torque.

In this method, permanent magnets of special shape must be made, which increases manufacturing costs and is not suited for the automation of the production and assembly.

Therefore it is a principal object of this invention to provide a permanent magnet type rotary electric device and method of manufacture therefore capable of effecting decreased cogging torque and suited for automation of manufacturing without increasing cost.

SUMMARY OF INVENTION

A first feature of this invention is adapted to be embodied in a permanent magnet type rotary electric machine of reduced cogging torque. The machine has a permanent magnet element comprised of a plurality of permanent magnets of alternate polarity in a circumferential direction. These permanent magnets are of substantially the same shape and disposed circumferentially at equal intervals. An armature element is juxtaposed to the permanent magnet element and has a number of circumferentially spaced core teeth around which coils are wound. The core teeth defining a number N of slots therebetween. The permanent magnet element and the armature element are supported for relative rotation. The circumferential magnet angle made by the permanent magnets with respect to the axis of relative rotation produces an effective cogging number that is substantially greater than the least common multiple of the number of slots S and the number of poles P.

A second feature of the invention is adapted to be embodied in a permanent magnet type rotary electric machine of the type described in the preceding paragraph. In accordance with this feature, the magnitudes of torque exerted on the permanent magnets of N and S poles of the magnet element are selected so that both of the torque values substantially cancel each other.

Yet another feature of the invention is adapted to be embodied in a method of making a permanent magnet type rotary electric machine of reduced cogging torque. The method comprising the steps of constructing a permanent magnet element comprised of a plurality of permanent magnets of alternate polarity in a circumferential direction with the permanent magnets being of substantially the same shape and disposed circumferentially at equal intervals. An armature element is juxtaposed to the permanent magnet element and has a number of circumferentially spaced core teeth around which coils are wound. The core teeth define a number N of slots therebetween. The permanent magnet element and the armature element are supported for relative rotation. The circumferential magnet angle made by the permanent magnets with respect to the axis of relative rotation is selected to produce a cogging number that is substantially greater than the least common multiple of the number of slots S and the number of poles P.

A still further feature of the invention is adapted to be embodied in a method as set forth in the preceding paragraph, however the magnitudes of torque exerted on the permanent magnets of N and S poles of the magnet element are selected so that both of the torque values substantially cancel each other.

DETAILED DESCRIPTION

Before going directly to a description of the preferred embodiments, some general discussion of the theory of the invention will assist those skilled in the art to understand the invention. It has been generally assumed that under certain conditions, the cogging number per revolution of is the least common multiple of the number of slots S and the number of poles P. However the inventors have determined that by selecting the circumferential angle (magnet angle) of the permanent magnet with respect to the axis of rotation the cogging number can be significantly increased from this calculated cogging number. This invention therefore selects the magnet angle of the permanent magnets to increase the actual cogging number and also to decrease the cogging torque by canceling out the cogging torques caused by the alternate poles. This could have been achieved by testing various physical relationships, but has been expedited by computer analysis, as will be described shortly.

Figure 1:
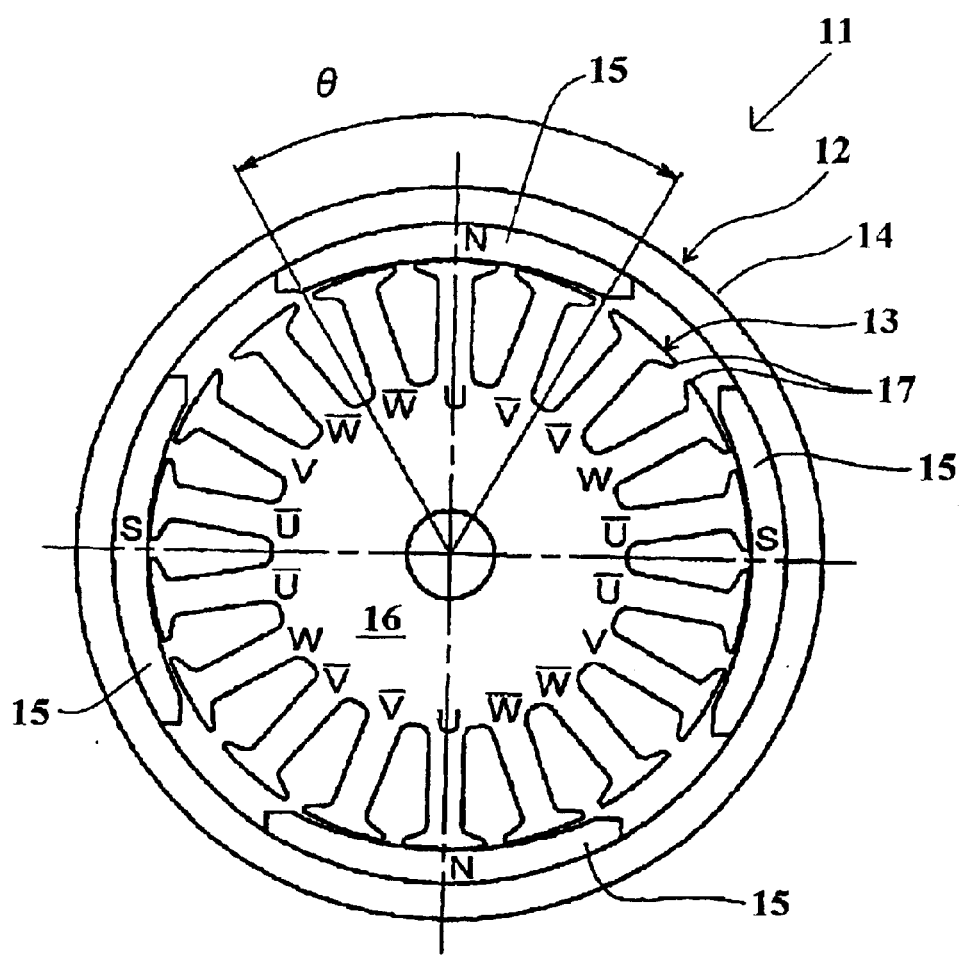
FIG. 1 is an end elevational view of a rotating electrical machine constructed in accordance with a first embodiment of the invention with the coil windings removed but the phases thereof indicated by reference characters.

Referring now in detail to the embodiment of FIG. 1, a rotating electrical machine constructed in accordance with this embodiment is identified generally by the reference numeral 11. Since the invention deals primarily with the number of permanent magnets and their circumferential extent and spacing and the number of cooperating pole teeth, the general overall construction is not illustrated and only the permanent magnet element, indicated generally by the reference numeral 12 and the cooperating magnetic pole tooth element, indicated generally by the reference numeral 13 are shown.

In addition, the winding of the pole teeth of the element 13 are not illustrated but it is to be understood that the individual teeth are wound in a three phase pattern with the phases indicated by the reference characters U, V, W. The pole teeth are wound in opposite directions with those with the overhead bar being oppositely wound with respect to those lacking the overhead bar.

In this illustrated embodiment, the permanent magnet element 12 rotates and is comprised of an outer shell 14 on which four permanent magnets, indicated by the reference numeral 15 are affixed in circumferentially spaced positions. The permanent magnets 15 have an arcuate configuration and each has substantially the same physical characteristics with the magnet angle θ of each being equal and of an extent which will be described shortly.

The coil winding element 13 is comprised of a fixed central part 16 from which eighteen (18) core teeth 17 extend in a radial direction with their tips being spaced closely proximate to the permanent magnets 15. The winding of the coils thereon is as afore described. Although the system is described in conjunction with a rotating permanent magnet and a fixed pole core element which is disposed circumferentially inwardly thereof, the opposite relation can be employed and the rotational elements and affixed elements being reversed. The angle between the centers of the permanent magnets 15 is 90° in this embodiment.

In accordance with the invention, the magnet angle θ is chosen in such a way that even though the normally assumed cogging number for the machine 11 would be 36, this being the lowest integral equally divisible by the number (4) of permanent magnets 15 and number (18) of magnetic pole teeth 17, the magnet angle is chosen so that the cogging torques of the individual magnets will cancel each other out substantially and to provide a cogging number that is twice that would normally be expected i.e. 72. Although this effect could be achieved by running a number of tests at varying magnet angles, the inventors have discovered that the computation can be simulated through readily available software.

This software is one of electromagnetic field analyzing tools for electromechanical design and is capable of calculating torque exerted on a selected portion. For example software sold under the name "Maxwell 2D Field Simulator" supplied by "Ansoft Japan Co., Ltd." (head office: 3-18-20 Shin-Yokohama, Kohoku-ku, Yokohama-shi, Kanagawa Japan) can be employed.

Thus, with this software, if various conditions such as a magnet angle θ of a permanent magnet, dimensions and the disposition of the permanent magnet, and the like are inputted, torque $T_N$ exerted on the permanent magnets 15N of N poles and torque $T_S$ exerted on the permanent magnets 15S of S poles can be individually determined. Also, the total cogging torque $T_{(N+S)}$ can be determined by summing the torques $T_N$ and torque $T_S$ exerted on the permanent magnets 15N and 15S of N and S poles are added together to determine cogging torque generated in the rotor 12.

Figure 2A:
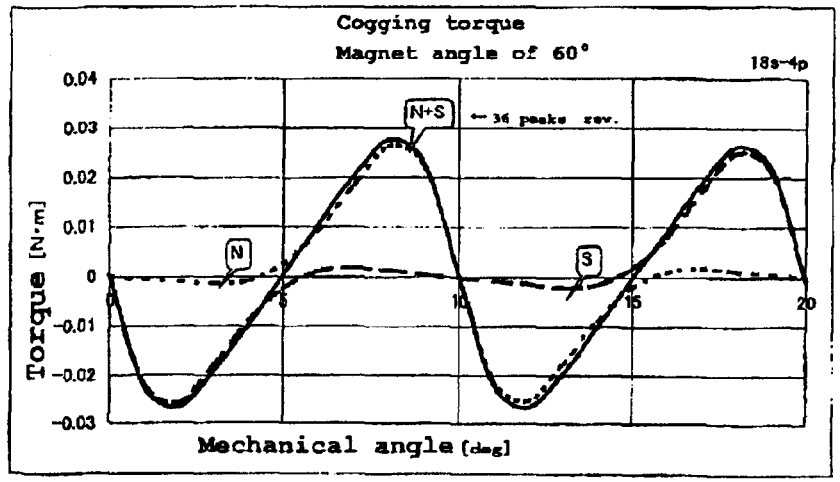
FIGS. 2A, 2B and 2C are graphical views showing three different magnet angles and the cogging torque resulting therefrom.
Figure 2B:
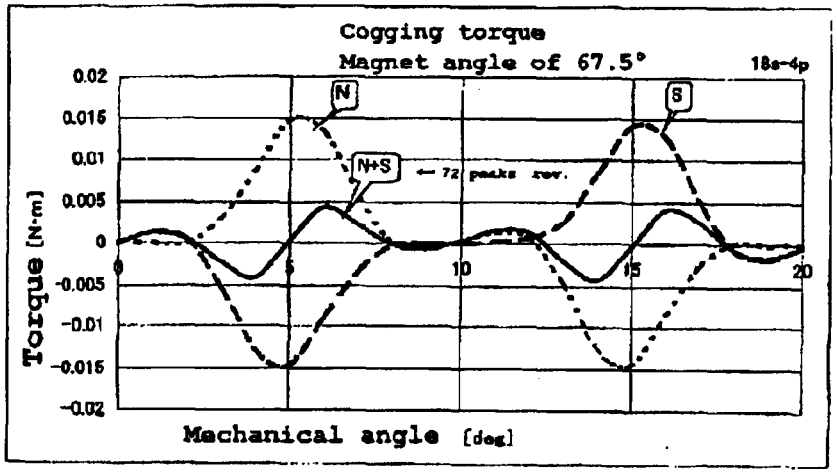
Figure 2C:
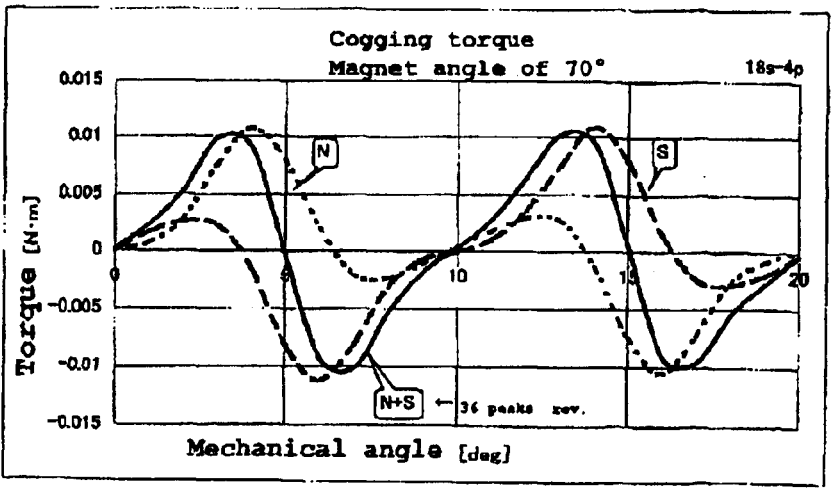

These calculated torques are shown in FIGS. 2A, 2B and 2C which show changes in the torque when the magnet angle θ of each permanent magnet 18 is varied between 60°, 67.5° and 70°, respectively, with other physical conditions being maintained the same. In these figures, torque $T_N$, $T_S$, and $T_{(N+S)}$ are represented by N, S and N+S. The horizontal axis represents the mechanical angle, in degrees and a mechanical angle of 20° corresponds to an electrical angle of 40°.

From this analysis, in the case of the magnet angle θ=60° (FIG. 2A), the positions of the positive and negative peaks of torque $T_N$ and torque $T_S$ are offset by 5° in mechanical angle (10° in electrical angle). Therefore the cogging torque $T_{(N+S)}$ of the sum of these torque values increases greatly in the positive and negative directions in a range of the mechanical angle of 10°. Also the peaks of the cogging torque $T_{(N+S)}$ appear 36 times in one revolution of the rotor 12, the same as the normally calculated cogging number. In this example, the cogging torque T $_{(N+S)}$ required to pass over the peaks is about 0.054 N.m.

Similarly, in the case of the magnet angle θ=70° (FIG. 2C), while peaks of $T_N$ and $T_S$ moves to the left on FIG. 2C, the peaks appear 36 times for one revolution of the rotor 12 as in the case of θ=60°. The cogging torque $T_{(N+S)}$ required to get over the peaks is about 0.022 N.m.

On the other hand, in the case of the magnet angle θ=67.5° (FIG. 2B), the changes in the torque become greater. That is, mechanical angles at which peaks of the torque $T_N$ exerted on the permanent magnets 15N of N poles and the torque $T_S$ exerted on the permanent magnets 15S of S poles are produced come to very close to each other. As a result, peaks of the sum $T_{(N+S)}$ of these torque values appears at half the period of that of the cases (2A), (2C), and 72 times for one revolution of the rotor 12. A much smaller cogging torque $T_{N+S}$) required to get over these peaks is 0.008 N.m. As a result of the foregoing analysis, it can be seen that in the case of the magnet angle θ=67.5°, the cogging number per revolution of the rotor 12 is 72, which is two times the least common multiple 36 of the number S (=18) of slots and the number P (=4) of poles.

Although in this embodiment the magnet angle θ is set at an angle near θ=67.5°, a magnet angle θ at which the cogging number increases, can also be found in a range below θ=60°. For example, it is expected that there is a desirable magnet angle θ at an angle near θ=57°. Also, as already noted, this invention can be applied not only to the outer rotor type motor or generator, but also to the inner rotor type.

Figure 3:
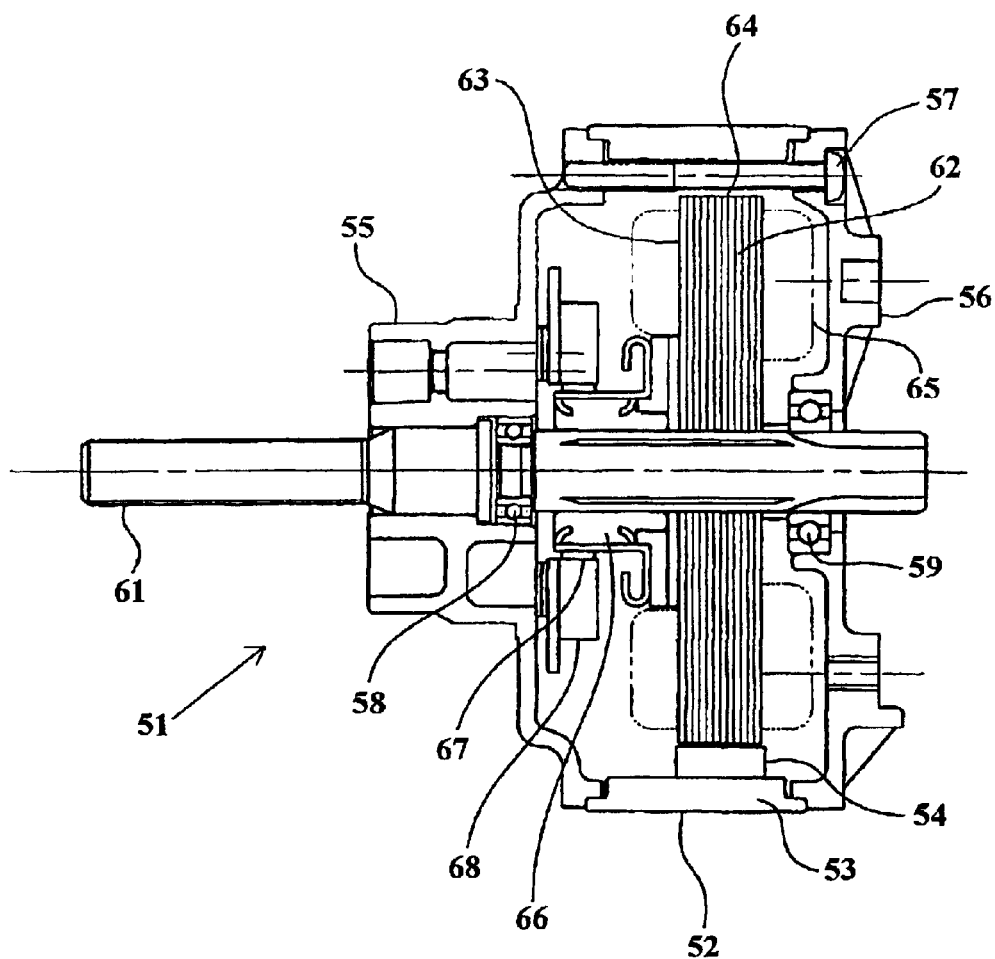
FIG. 3 is a cross sectional view taken along a plane containing the axis of rotation of a rotating electrical machine constructed in accordance with a second embodiment of the invention.
Figure 4:
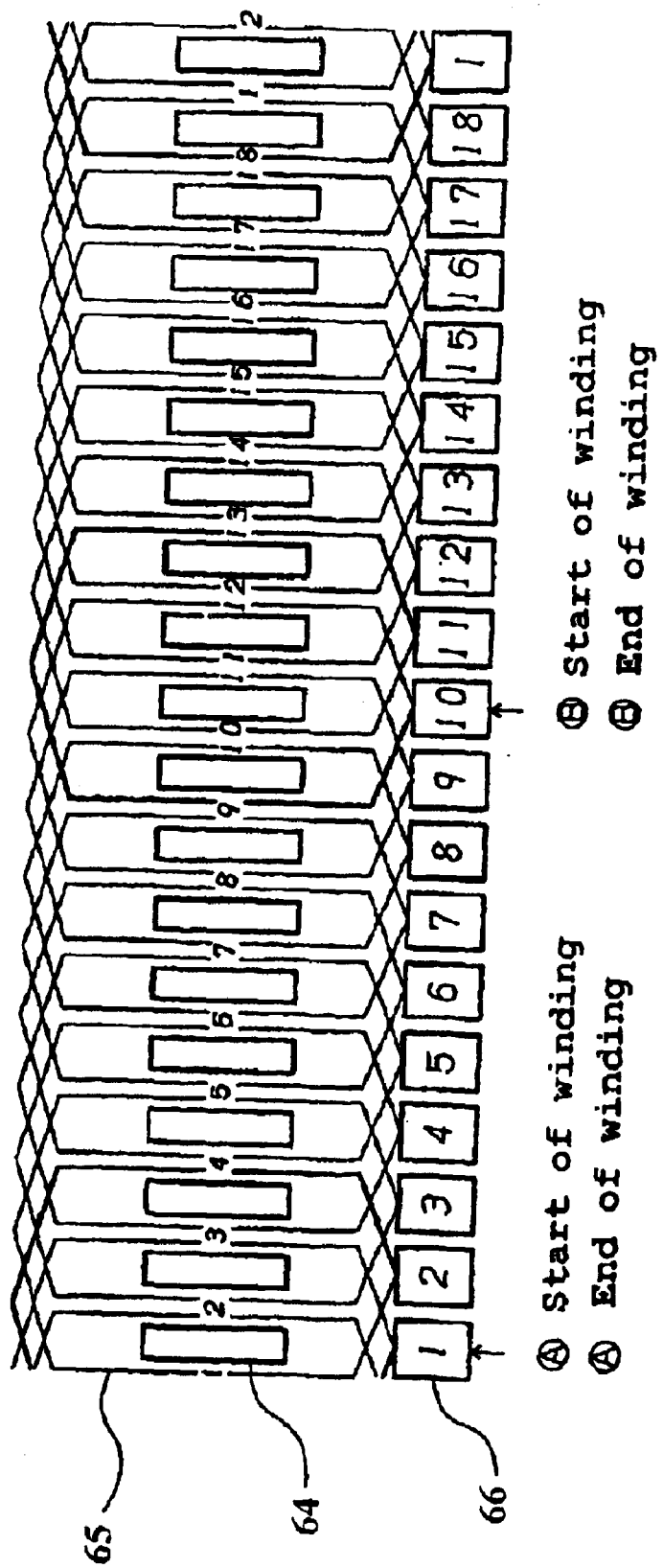
FIG. 4 is a developed view showing the coil windings of this embodiment.

FIGS. 3 and 4 show a second embodiment of the invention with FIG. 3 being a cross sectional view taken through the axis of rotation of the rotating electrical machine constructed in accordance with this embodiment and which is indicated generally by the reference numeral 51. In this embodiment, the machine 51 is a motor, but again it will be apparent to those skilled in the art how the invention can be employed in conjunction with generators.

The motor 51 has an outer housing, indicated generally by the reference numeral 52 which is comprised of a circumferentially extending stator shell 53 which has a plurality of circumferentially spaced cylindrical permanent magnet segments 54 affixed thereto with alternating polarities. As with the previously described embodiment, there are four permanent magnets 54 and these magnets have a magnet angle of about 67.5°.

The motor housing 52 is completed by end closures 55 and 56 that are detachably affixed to the stator shell 53 by fasteners 57. Bearings 58 and 59 are fixed in the end closures 55 and 56 and journal the end of a rotor shaft 61. The rotor shaft 61 has affixed to it a laminated core assembly, indicated generally by the reference numeral 62 which has a cylindrical inner portion that is suitably fixed to the shaft 61 and from which eighteen (18) pole teeth 63 extend. The tip ends 64 of the pole teeth are in confronting relationship to the permanent magnets 54.

Windings 65 encircle these pole teeth 63 and are wound in a pattern as shown in the developed view of FIG. 4. These windings 65 are connected at their ends to respective commutator strips 66 as shown in FIGS. 3 and 4. These commutator strips 66 are suitably affixed to the rotor shaft 61 and are engaged by brushes 67 held by respective brush holders 68 so as to transfer electrical current to the windings 65, in a manner well known in this art. Thus, this embodiment like the previously described embodiment, results in a cogging number of 72 which is at least twice the common multiple 36 of the number of magnets 54 and pole teeth 63.

Therefore, from the foregoing description it should be readily apparent that it is possible to reduce the cogging torque by increasing the cogging number without necessarily increasing the number of pole teeth or permanent magnets as previously thought. Of course, this advantage applies to electrical motors or electrical generators and, in fact, can be applied to linear electrical machines. Of course, the foregoing description is that of preferred embodiments of the invention and various changes and modifications may be made without departing from the spirit and scope of the invention, as defined by the appended claims.

What is claimed is:

1. A permanent magnet type rotary electric machine of reduced cogging torque, said machine having a permanent magnet element comprised of a plurality of permanent magnets of alternate polarity in a circumferential direction, said permanent magnets being of substantially the same shape and disposed circumferentially at equal intervals with equal gaps therebetween, an armature element juxtaposed to said permanent magnet element and having a number of circumferentially spaced core teeth around which coils are wound, said core teeth defining a number N of slots therebetween, said permanent magnet element and said armature element being supported for relative rotation, the circumferential magnet angle made by each of said permanent magnets with respect to the axis of relative rotation producing a cogging number that is an integral multiple substantially greater than the least common multiple of the number of slots S and the number of poles P.

2. A permanent magnet type rotary electric machine as set forth in claim 1, wherein the cogging number is at least twice the least common multiple of the number of slots S and the number of poles P.

3. A permanent magnet type rotary electric machine as set forth in claim 2, wherein the magnitudes of torque exerted on the permanent magnets of N and S poles of the rotor are selected so that both of the torque values substantially cancel each other.

4. A permanent magnet type rotary electric machine as set forth in claim 2, wherein the number of poles P of the permanent magnet element is an even number no smaller than four and the number of slots S is not a multiple of P.

5. A permanent magnet type rotary electric machine as set forth in claim 1, wherein the rotary electric device is comprising a DC motor of reduced cogging torque, said motor having a permanent magnet element comprised of a plurality of permanent magnets of alternate polarity in a circumferential direction, said permanent magnets being of substantially the same shape and disposed circumferentially at equal intervals, an armature element juxtaposed to said permanent magnet element and having a number of circumferentially spaced core teeth around which coils are wound, said core teeth defining a number N of slots therebetween, said permanent magnet element and said armature element being supported for relative rotation, the circumferential magnet angle made by each of said permanent magnets with respect to the axis of relative rotation producing a cogging number that is an integral multiple substantially greater than the least common multiple of the number of slots S and the number of poles P, the number of slots S is eighteen and the number of poles P is four, and the magnet angle made by the said permanent magnets with respect to the axis of relative rotation is substantially equal to 67.5°.

6. A permanent magnet type rotary electric machine as set forth in claim 1, wherein the magnitudes of torque exerted on the permanent magnets of N and S poles of the rotor are selected so that both of the torque values substantially cancel each ether.

7. A permanent magnet type rotary electric machine of reduced cogging torque, said machine having a permanent magnet element comprised of a plurality of permanent magnets of alternate polarity in a circumferential direction, said permanent magnets being of substantially the same shape and disposed circumferentially at equal intervals with equal gaps therebetween, an armature element juxtaposed to said permanent magnet element and having a number of circumferentially spaced core teeth around which coils are wound, said core teeth defining a number N of slots therebetween, said permanent magnet element and said armature element being supported for relative rotation, the magnitudes of torque exerted on the permanent magnets of N and S poles of the rotor are selected so that both of the torque values substantially cancel each other.

8. A permanent magnet type rotary electric machine as set forth in claim 7, wherein the rotary electric device is of reduced cogging torque comprising a DC motor, the number of slots S is eighteen and the number of poles P is four, having a permanent magnet element comprised of a plurality of permanent magnets of alternate polarity in a circumferential direction, said permanent magnets being of substantially the same shape and disposed circumferentially at equal intervals, an armature element juxtaposed to said permanent magnet element and having a number of circumferentially spaced core teeth around which coils are wound, said core teeth defining a number N of slots therebetween, said permanent magnet element and said armature element being supported for relative rotation, the magnitudes of torque exerted on the permanent magnets of N and S poles of the rotor are selected so that both the torque values substantially cancel each other, and the magnet angle made by the said permanent magnets with respect to the axis of relative rotation is substantially equal to 67.5°.

9. A method of making a permanent magnet type rotary electric machine of reduced cogging torque, said method comprising the steps of constructing a permanent magnet element comprised of a plurality of permanent magnets of alternate polarity in a circumferential direction with the permanent magnets being of substantially the same shape and disposed circumferentially at equal intervals with equal gaps therebetween, juxtaposing an armature element to the permanent magnet element and having a number of circumferentially spaced core teeth around which coils are wound, the core teeth define a number N of slots therebetween, supported the permanent magnet element and the armature element for relative rotation, selecting the number of poles P of the permanent magnet element as an even number no smaller than four, selecting the number of slots S so that it is not a multiple of P, and selecting the circumferential magnet angle made by the permanent magnets with respect to the axis of relative rotation to produce a cogging number that is an integral multiple substantially greater than the least common multiple of the number of slots S and the number of poles P.

10. A method of making magnet type rotary electric machine as set forth in claim 9, wherein the cogging number is at least twice the least common multiple of the number of slots S and the number of poles P.

11. A method of making magnet type rotary electric machine as set forth in claim 10, wherein the magnitudes of torque exerted on the permanent magnets of N and S poles of the rotor are selected so that both of the torque values substantially cancel each other.

12. A method of making magnet type rotary electric machine as set forth in claim 10, wherein the number of poles P of the permanent magnet element is an even number no smaller than four and the number of slots S is not a multiple of P.

13. A method of making magnet type rotary electric machine as set forth in claim 9, wherein the rotary electric device is comprising a DC motor, the number of slots S is eighteen and the number of poles P is four, said method comprising the steps of constructing a permanent magnet element comprised of a plurality of permanent magnets of alternate polarity in a circumferential direction with the permanent magnets being of substantially the same shape and disposed circumferentially at equal intervals, juxtaposing an armature element to the permanent magnet element and having a number of circumferentially spaced core teeth around which coils are wound, the core teeth define a number N of slots therebetween, supported the permanent magnet element and the armature element for relative rotation, selecting the number of poles P of the permanent magnet element as an even number no smaller than four, selecting the number of slots S so that it is not a multiple of P, and selecting the circumferential magnet angle made by the permanent magnets with respect to the axis of relative rotation to produce a cogging number that is an integral multiple substantially greater than the least common multiple of the number of slots S and the number of poles P, and the magnet angle made by the permanent magnets with respect to the axis of relative rotation is substantially equal to 67.5°.

14. A method of making magnet type rotary electric machine as set forth in claim 9, wherein the magnitudes of torque exerted on the permanent magnets of N and S poles of the rotor are selected so that both of the torque values substantially cancel each other.

15. A method of making magnet type rotary electric machine of reduced cogging torque, said machine having a permanent magnet element comprised of a plurality of permanent magnets of alternate polarity in a circumferential direction, said permanent magnets being of substantially the same shape and disposed circumferentially at equal intervals with equal gaps therebetween, an armature element juxtaposed to said permanent magnet element and having a number of circumferentially spaced core teeth around which coils are wound, said core teeth defining a number N of slots therebetween, said permanent magnet element and said armature element being supported for relative rotation, the magnitudes of torque exerted on the permanent magnets of N and S poles of the rotor are selected so that both of the torque values substantially cancel each other.

16. A method of making magnet type rotary electric machine as set forth in claim 15, wherein tho rotary electric device is comprising a DC motor, the number of slots S is eighteen and the number of poles P is four, having a permanent magnet element comprised of a plurality of permanent magnets of alternate polarity in a circumferential direction, said permanent magnets being of substantially the same shape and disposed circumferentially at equal intervals, an armature element juxtaposed to said permanent magnet element and having a number of circumferentially spaced core teeth around which coils are wound, said core teeth defining a number N of slots therebetween, said permanent magnet element and said armature element being supported for relative rotation, the magnitudes of torque exerted on the permanent magnets of N and S poles of the rotor are selected so that both of the torque values substantially cancel each other, and the magnet angle made by the permanent magnet with respect to the axis of relative rotation is being substantially equal to 67.5°.

17. A method of making magnet type rotary electric machine as set forth in claim 15, wherein the permanent magnet angle is arrived at from a computer simulation of the torques on the individual magnets.

* * * * *